Figure 1:
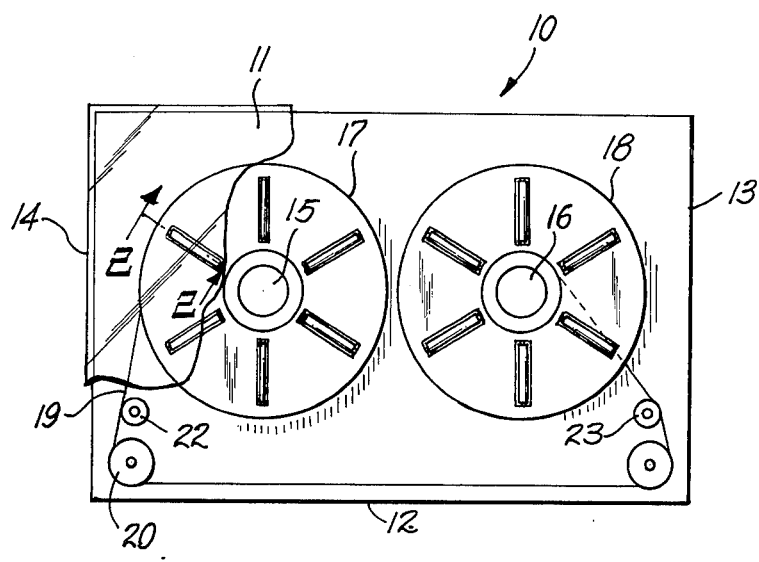

United States Patent [19]

Holcomb

[11] 4,065,075
[45] Dec. 27, 1977

[54] TAPE TRANSPORT FOR A CASSETTE

[76] Inventor: Larry Wayne Holcomb, Rte. 2 Box 130-A, Warrenton, Va. 22186

[21] Appl. No.: 676,904

[22] Filed: Apr. 14, 1976

[51] Int. Cl.² .................... G11B 23/10; G11B 15/60
[52] U.S. Cl. .................. 242/199; 242/71.8; 242/76; 242/210; 360/96
[58] Field of Search ............ 242/199, 200, 198, 197, 242/71.2, 71.8, 210, 76, 54.1, 194, 55, 78.6; 360/96; 206/387, 389; 352/72, 78 R

[56] References Cited

U.S. PATENT DOCUMENTS

| | | | |
|---|---|---|---|
| 2,833,489 | 5/1958 | Hall | 242/76 X |
| 3,529,788 | 9/1970 | Sasaki et al. | 242/199 |
| 3,625,455 | 12/1971 | Streets | 242/199 |
| 3,656,705 | 4/1972 | Boyer | 242/199 |
| 3,826,489 | 7/1974 | Watkins, Jr. | 242/199 X |
| 3,887,943 | 6/1975 | Katsurayama | 360/96 |

FOREIGN PATENT DOCUMENTS

| | | | |
|---|---|---|---|
| 2,151,386 | 4/1973 | Germany | 242/199 |
| 1,188,366 | 4/1970 | United Kingdom | 242/197 |

Primary Examiner—George F. Mautz

[57] ABSTRACT

In a tape transport for a cassette for recording and reproducing apparatus, wherein reversibly driven feed reels and take-up reels are rotatably located in said cassette and providing tape tensioning means in the form of assist rollers to exert a continuous tensioning force on the moving tape, the improvement of including therein three or more recessed pin rollers located in the outer faces of said reels to reduce friction between said faces and the inner walls of said cassette.

6 Claims, 2 Drawing Figures

U.S. Patent  Dec. 27, 1977  4,065,075

TAPE TRANSPORT FOR A CASSETTE

Conventional tape magazines are not bothered by breakage at high speed operation because the 4 or more mil thickness of the tape will not break during rapid passage despite the presence of internal flutter and friction. Since High-Fi expansion, there is a great need to provide long playing tapes that can be used for 1 hour or more. If it be desired to still use the conventional cassette, it would then be necessary to reduce the mil thickness to 2. This reduction in strength at rapid passage would cause internal flutter and friction, and would result in breaking the tape.

This invention is therefore directed to the problem of avoiding breaking of such a 2 mil tape during rapid passage by reducing the presence of flutter and friction within the cassette during such rapid passage of the tape in conventional cassettes.

The instant invention relates to apparatus for storing and reading information or applying information on a flexible recording tape or film and more particularly, to such an apparatus that provides a reduced friction feed system for hour long tape recording or reading and minimizing the possibility of breaking the tape.

The instant invention contemplates the use of a tape cartridge which encloses the tape and its reversible take-up and feed reels and provides additional tensioning rolls to prevent any possible fluttering of the tape in its passage from reel to reel.

It is therefore one object of this invention to provide a novel tape transport system that provides reduced friction for the use in computers, data processing and recorders. Another object of this invention is to reduce fluttering of the tape during its passage between the feed reel and the take-up reel.

The object of this invention is to provide suitably spaced pin rollers on the outer faces of the reels to eliminate any possibility of binding friction with the inner walls of the cassette housing.

Figure 2:
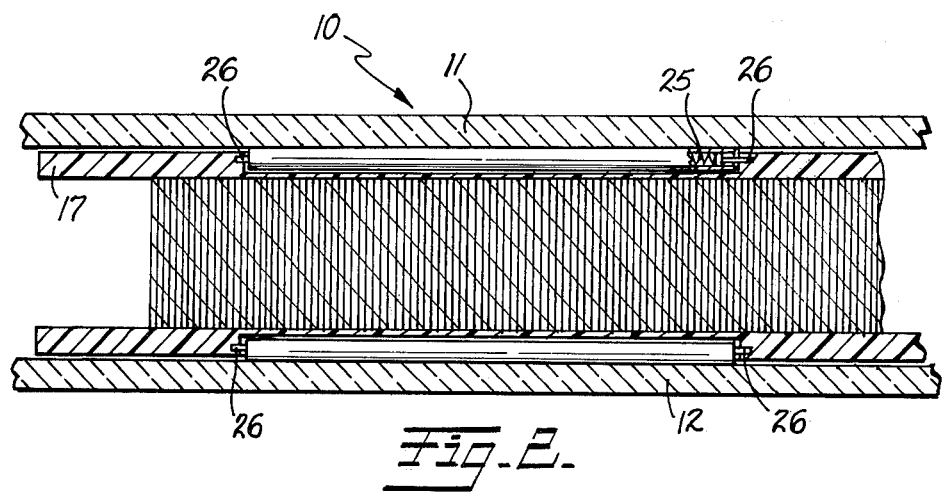

These and other objects of this invention will become apparent when reading the accompanying description and drawing in which:

FIG. 1 is a plan view of the tape magazine in the cassette with the top wall removed for a clear showing of the tape mounting; and FIG. 2 is an enlarged fragmentary vertical sectional view taken along line 2—2 of FIG. 1 showing the pin-roller mounting.

There is shown in FIG. 1, a magazine tape feed for a two mil thickness tape spaced in a cassette housing 10, having side walls 11, 12, 13 and 14 which may be fabricated of molded plastic or sheet metal. Shafts 15 and 16 bearingly support reels 17 and 18. Tape 19 unwinds from reversible reel 17 and passes around and in contact with tensioning roller 22 which will prevent some of the flutter of the tape during rapid passage. After the tape passes around directional rollers 20, it proceeds to the reversible take-up reel 18. There again, there is some possibility of flutter so a second tensioning roller 23 is conventional provided to maintain a continuous tensioning force on the tape as it is wound up upon the take-up reel 18. Although most of the flutter of the tape during rapid passage occurs after leaving the feed reel, it is possible that additional flutter may be present between the direction roller 20 and take-up roller 18, thus necessitating the use of a similar tensioning roller 23. These tensioning rollers may be the same size or smaller than the directional rollers 20, and may be idler rollers or driven rollers. In addition, it is contemplated that as many as 2 or 3 rollers may be used between the reels, if needed, and the directional rollers at either the feed reel or the take-up reel or at both reels.

Rapid movement of the reels may cause them to precess and make friction contact with the inner face walls of the cassette. It is at this point of precessing that a thin tape will break. It is conventional to provide accurately centered bushing to avoid this problem. However, dust and long use can upset this fine centering. By this invention, assurance of eliminating friction at this point is provided by locating spring 25 and actuated pin recessed-mounted rollers 26, as shown in FIG. 2, in the outer faces of the reels. These rollers are made of rubber or equivalent resilient resinous material. The rollers which extend outwardly from the reels are provided in multiples of three, for example, three, six, or nine, in the recessed portions. This recessing enables the cassette to still be of conventional size. However, if reels are to contain 2 hour long tapes, a slightly larger cassette may be needed to house it.

In use, the cassette tape system would include the use of at least 2 or 3 motors, and a suitable mechanical brake system to stop the tape at high rewind and fast forward speeds so that each of the reels stop at the same time. It is also essential to use from 2 to 5 feet of tapered tape mechanically attached or by gluing to each of the reels.

This reduced friction tape feeding magazine is adapted for simple, straightforward operative coupling with either tape readers, recorders, printers, computers and other peripheral input-output devices.

The present invention is not restricted to the illustrated embodiments because it may also be applied in any device that contains a tape feeding system.

While I have disclosed an embodiment of the present invention, it is understood that this embodiment is given by way of example only, and not in a limiting sense, the scope of the present invention being determined by the objects and the claims.

What is claimed is:

1. In a tape cassette for magnetic recording and reproducing apparatus including reversibly driven feed and take-up reels wherein continuous tensioning force is provided on the moving tape by inclusion of a tensioning roller between the feed reel and the directional guide roller, the improvement wherein each of said reels includes recessed portions in the outer faces thereof, three or more, in multiples of three, equidistantly spaced spring actuated pin rollers in said recessed portions and extending outwardly from said outer faces of said reels whereby frictional contact between the cassette and the reels is reduced during tape movement.

2. A tape cassette including a set of driven reversibly mounted feed and take-up reels wherein each of said reels includes recessed portions in the outer faces thereof, three or more, in multiples of three, equidistantly spaced spring actuated pin rollers located in said portions recessed and extending outwardly from said faces of said reels whereby frictional contact between the cassette and the reels is reduced during tape movement.

3. The device of claim 2 wherein three pin rollers are used.

4. The device of claim 2 wherein six pin rollers are used.

5. The device of claim 2 wherein nine pin rollers are used.

6. The device of claim 2 wherein the rollers are formed of resilient material.

* * * * *